(12) United States Patent
Yamada et al.

(10) Patent No.: US 9,490,710 B2
(45) Date of Patent: *Nov. 8, 2016

(54) POWER SUPPLY DEVICE FOR SUPPLYING POWER TO A LOAD BY COMBINING A SECONDARY BATTERY AND A CAPACITOR

(71) Applicant: VOLVO TRUCK CORPORATION, Gothenburg (SE)

(72) Inventors: Yoshiaki Yamada, Saitama (JP); Takayuki Tsuchiya, Saitama (JP); Kunihiko Hikiri, Saitama (JP); Koichi Itani, Saitama (JP); Noriaki Miyake, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/653,397
(22) PCT Filed: Dec. 18, 2012
(86) PCT No.: PCT/JP2012/082819
§ 371 (c)(1),
(2) Date: Jun. 18, 2015

(87) PCT Pub. No.: WO2014/097399
PCT Pub. Date: Jun. 26, 2014

(65) Prior Publication Data
US 2015/0333632 A1 Nov. 19, 2015

(51) Int. Cl.
*H02M 3/335* (2006.01)
*B60L 11/00* (2006.01)
(Continued)

(52) U.S. Cl.
CPC ........ *H02M 3/33507* (2013.01); *B60L 11/005* (2013.01); *B60L 11/18* (2013.01);
(Continued)

(58) Field of Classification Search
CPC ............ H02M 2001/0067; H02M 2001/0083; H02M 2007/4803; H02M 7/537; H02M 7/5387; H02M 3/33507; H02J 7/00; B60L 11/18; B60L 11/005; B60L 15/007; H01M 16/00; H01M 10/44

USPC .......................................... 307/9.1, 10.1, 82
See application file for complete search history.

(56) References Cited

U.S. PATENT DOCUMENTS 7,649,335 B2   1/2010  Ishikawa et al.
2011/0233996 A1*  9/2011  Kato ................... B60L 11/1887
                                        307/9.1

(Continued)

FOREIGN PATENT DOCUMENTS

JP  2003143713 A   5/2003
JP  2006345606 A   12/2006
WO  WO 2012140746 A1 * 10/2012 ................ B60L 1/00

OTHER PUBLICATIONS

Anonymous: "H bridge—Wikipedia, the free encyclopedia", Nov. 28, 2012, XP055296332, Wikipedia, the free encyclopedia, retrieved from the Internet: URL:https://en.wikipedia.org/w/index.php?title=H_bridge&oldid=525349317 [retrieved on Aug. 18, 2016].

(Continued)

*Primary Examiner* — Fred E Finch, III
*Assistant Examiner* — Rafael O. De León Domenech
(74) *Attorney, Agent, or Firm* — Laurence A. Greenberg; Werner H. Stemer; Ralph E. Locher

(57) ABSTRACT

A power supply device supplies power to a load by combining a secondary battery and a capacitor connected in parallel to the secondary battery. The power supply device includes an insulation type DC-DC converter with a primary coil connected in parallel to the secondary battery and configured to accumulate energy by a current supplied from the secondary battery and a secondary coil configured such that an induction current flows thereinto from the primary coil by the accumulated energy, and a switching circuit configured to selectively connect the secondary coil in series to the capacitor in forward and opposite directions.

8 Claims, 5 Drawing Sheets

(51) Int. Cl.
*B60L 11/18* (2006.01)
*B60L 15/00* (2006.01)
*H01M 10/44* (2006.01)
*H02J 7/34* (2006.01)
*H01M 16/00* (2006.01)
*H02J 7/00* (2006.01)
*H02M 1/00* (2006.01)
*H02M 7/48* (2007.01)
*H02M 7/537* (2006.01)
*H02M 7/5387* (2007.01)

(52) U.S. Cl.
CPC ......... *B60L 11/1812* (2013.01); *B60L 15/007* (2013.01); *H01M 10/44* (2013.01); *H01M 16/00* (2013.01); *H02J 7/00* (2013.01); *H02J 7/345* (2013.01); *B60L 2210/12* (2013.01); *B60L 2210/14* (2013.01); *B60L 2240/527* (2013.01); *B60L 2240/529* (2013.01); *H01M 2220/20* (2013.01); *H02M 7/537* (2013.01); *H02M 7/5387* (2013.01); *H02M 2001/0067* (2013.01); *H02M 2001/0083* (2013.01); *H02M 2007/4803* (2013.01); *Y02T 10/645* (2013.01); *Y02T 10/7005* (2013.01); *Y02T 10/7022* (2013.01); *Y02T 10/7072* (2013.01); *Y02T 10/7225* (2013.01); *Y02T 10/7233* (2013.01); *Y02T 10/92* (2013.01); *Y02T 90/127* (2013.01); *Y02T 90/14* (2013.01)

(56) References Cited

U.S. PATENT DOCUMENTS

| | | |
|---|---|---|
| 2011/0292690 A1 | 12/2011 | Liang et al. |
| 2012/0057373 A1 | 3/2012 | Liu et al. |
| 2012/0181990 A1* | 7/2012 | Asakura .............. B60L 11/1811 320/137 |
| 2014/0203634 A1* | 7/2014 | Sugiyama ................ B60L 1/00 307/10.1 |

OTHER PUBLICATIONS

Di Napoli A et al: "Multiple-Input DC-DC Power Converter for Power-Flow Management in Hybrid Vehicles" Conference Record of the 2002 IEEE Industry Applications Conference: 37th IAS Annual Meeting; Oct. 13-18, 2002, Pittsburgh, Pensylvasnia, USA; IEEE Service CE, vol. 3, Oct. 13, 2002, pp. 1578-1585, XP010610090, ISBN: 978-0-7803-7420-1.

* cited by examiner

POWER SUPPLY DEVICE FOR SUPPLYING POWER TO A LOAD BY COMBINING A SECONDARY BATTERY AND A CAPACITOR

TECHNICAL FIELD

The present invention relates to a power supply device for supplying power to a load.

BACKGROUND ART

Conventionally, a power supply device for supplying power to a load by combining a battery and a capacitor has been used. JP2006-345606A discloses a power supply system for vehicle in which a battery and a capacitor are connected in parallel. In this power supply system, an inverter for an electric motor is driven by electrical energy supplied from the capacitor and the battery.

SUMMARY OF INVENTION

However, in the power supply system of JP2006-345606A, the motor can be no longer driven by the electrical energy from the capacitor if a voltage of the capacitor drops below a voltage capable of driving the inverter. Further, unlike a secondary battery in which a voltage moderately decreases during discharge, the capacitor has a characteristic that a voltage linearly decreases during discharge. Thus, if the voltage of the capacitor drops, the inverter cannot be driven by the supply of the electrical energy from the capacitor despite the remaining electrical energy.

The present invention was developed in view of the above problem and aims to effectively utilize electrical energy of a capacitor.

According to one aspect of the present invention, a power supply device for supplying power to a load by combining a secondary battery and a capacitor connected in parallel to the secondary battery, the power supply device includes an insulation type DC-DC converter including a primary coil and a secondary coil, the primary coil being connected in parallel to the secondary battery, the primary coil being configured to accumulate energy by a current supplied from the secondary battery, the secondary coil being configured such that an induction current flows thereinto from the primary coil by the accumulated energy and a switching circuit configured to selectively connect the secondary coil in series to the capacitor in forward and opposite directions.

The details as well as other features and advantages of this invention are set forth in the remainder of the specification and are shown in the accompanying drawings.

DESCRIPTION OF EMBODIMENTS

Hereinafter, embodiments of the present invention are described with reference to the drawings.

First Embodiment

Figure 1:
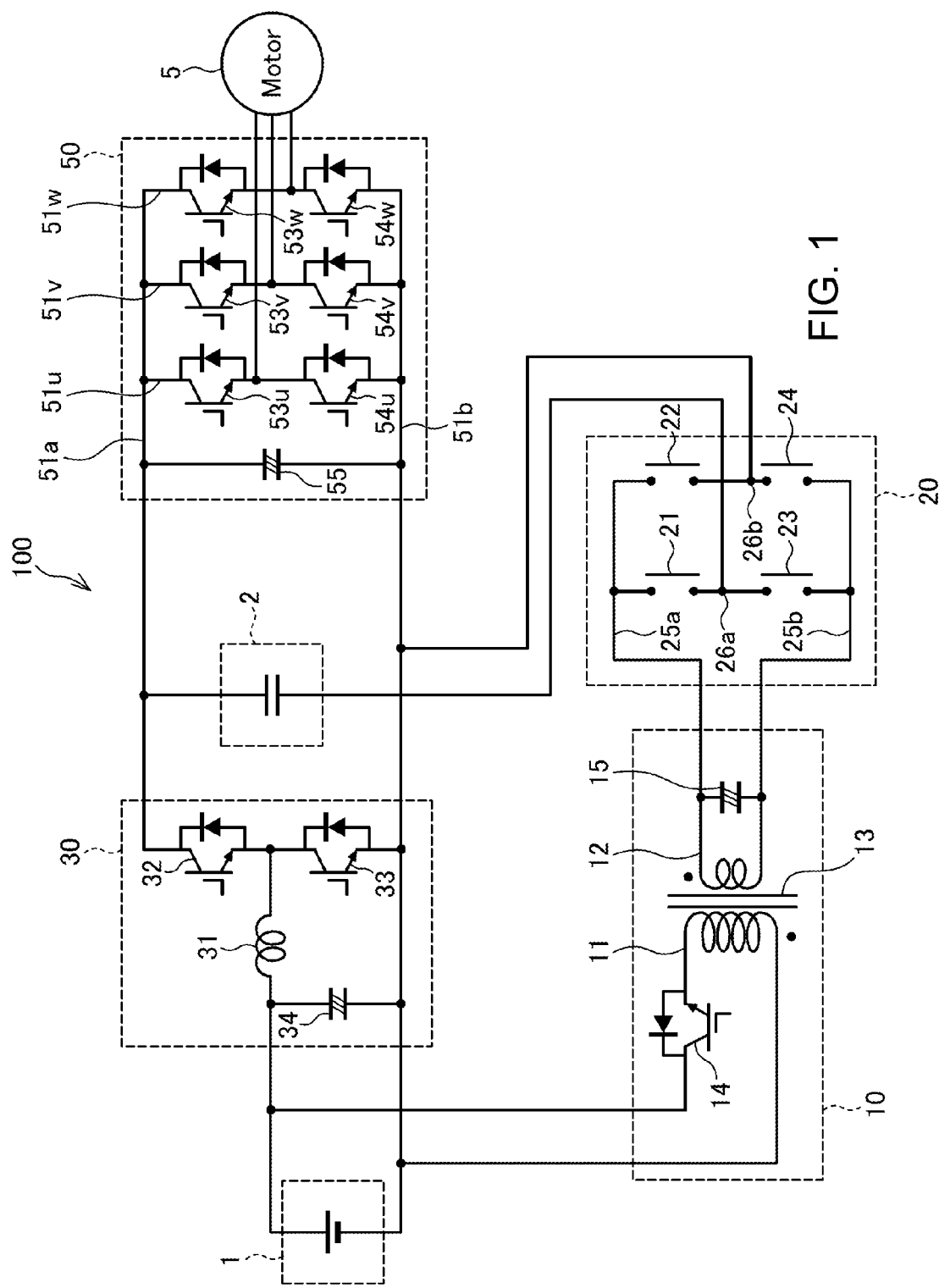
FIG. 1 is an electrical circuit diagram of a power supply device according to a first embodiment of the present invention.
Figure 2:
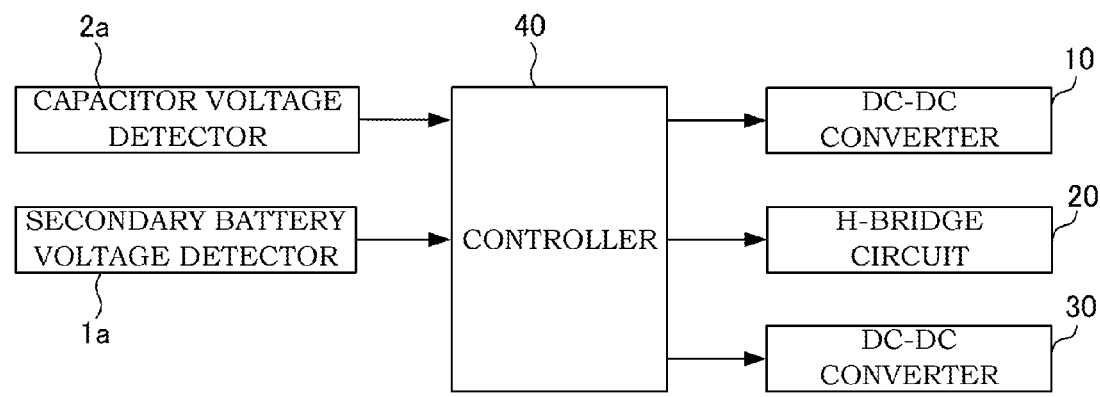
FIG. 2 is a block diagram of the power supply device according to the first embodiment of the present invention.

A power supply device 100 according to a first embodiment of the present invention is described below with reference to FIGS. 1 to 3.

The power supply device 100 supplies power to a load by combining a secondary battery 1 and a capacitor 2 connected in parallel to the secondary battery 1. This load is an inverter 50 for driving an electric motor 5 by the supply of power from the secondary battery 1 and the capacitor 2. The power supply device 100 is applied to an HEV (Hybrid Electric Vehicle), an EV (Electric Vehicle) and the like.

First, the inverter 50 to which power is supplied from the power supply device 100 and the electric motor 5 to be driven by the inverter 50 are described with reference to FIG. 1.

The electric motor 5 is a drive motor mounted in an HEV or an EV. The electric motor 5 is a three-phase induction motor generator which is driven by a rotating magnetic field generated by a three-phase alternating current. The electric motor 5 is provided with a stator including a plurality of coils (not shown) constituting each of a U-phase, a V-phase and a W-phase on an inner periphery and a rotator including a permanent magnet and configured to rotate on the inner periphery of the stator. The electric motor 5 is such that the stator is fixed to a vehicle body (not shown) and a rotary shaft of the rotator is coupled to an axle of wheels (not shown). The electric motor 5 can convert electrical energy into the rotation of the wheels and can convert the rotation of the wheels into electrical energy.

The inverter 50 is a voltage-to-current converter for generating alternating current power from direct current power supplied from the secondary battery 1 and the capacitor 2. The inverter 50 has a rated voltage of 600 V and a drivable minimum voltage of 400 V. This minimum voltage corresponds to a minimum operating voltage capable of driving the load.

The inverter 50 converts the direct current power supplied from the secondary battery 1 and the capacitor 2 into a three-phase alternating current composed of a U-phase, a V-phase and a W-phase shifted at an interval of 120° and supplies it to the electric motor 5.

The inverter 50 includes a positive-side power line 51a, a negative-side power line 51b, a U-phase power line 51u, a V-phase power line 51v and a W-phase power line 51w. The positive-side power line 51a is connected to positive electrodes of the secondary battery 1 and the capacitor 2. The negative-side power line 51b is connected to negative electrodes of the secondary battery 1 and the capacitor 2. The U-phase power line 51u, the V-phase power line 51v and the W-phase power line 51w are provided between the positive-side power line 51a and the negative-side power line 51b. Further, a smoothing condenser 55 for smoothing a voltage of a direct current transferred between the secondary battery 1, the capacitor 2 and the inverter 50 is connected in parallel between the positive-side power line 51a and the negative-side power line 51b.

The inverter 50 includes IGBTs (Insulated Gate Bipolar Transistors) 53u, 54u, 53v, 54v, 53w and 54w as six switching elements. These IGBTs 53u to 54w are each an IGBT with a rectifying diode connected in parallel in an opposite direction.

The IGBT 53u and the IGBT 54u are provided in series in the U-phase power line 51u. The U-phase power line 51u between the IGBT 53u and the IGBT 54u is connected to the coil constituting the U-phase of the electric motor 5. The IGBT 53v and the IGBT 54v are provided in series in the V-phase power line 51v. The V-phase power line 51v between the IGBT 53v and the IGBT 54v is connected to the coil constituting the V-phase of the electric motor 5. The IGBT 53w and the IGBT 54w are provided in series in the W-phase power line 51w. The W-phase power line 51w between the IGBT 53w and the IGBT 54w is connected to the coil constituting the W-phase of the electric motor 5.

The inverter 50 generates an alternating current to drive the electric motor 5 by the IGBTs 53u, 54u, 53v, 54v, 53w and 54w being controlled by a motor controller (not shown).

Next, the configuration of the power supply device 100 is described with reference to FIGS. 1 and 2.

The power supply device 100 includes the secondary battery 1, the capacitor 2, an insulation type DC-DC converter (hereinafter, merely referred to as a "DC-DC converter") 10 for applying a bias voltage to the capacitor 2 by utilizing electrical energy of the secondary battery 1, an H-bridge circuit 20 as a switching circuit for selectively applying a bias voltage to the capacitor 2 in forward and opposite directions, a non-insulation type DC-DC converter (hereinafter, merely referred to as a "DC-DC converter") 30 capable of supplying a current to the inverter 50 by stepping up a voltage of the secondary battery 1, and a controller 40 (see FIG. 2) for controlling the DC-DC converter 10, the H-bridge circuit 20 and the DC-DC converter 30.

The secondary battery 1 is a chemical battery such as a lithium ion secondary battery or a nickel hydrogen secondary battery. Here, a voltage of the secondary battery 1 is set at 300 V. The secondary battery 1 includes a secondary battery voltage detector 1a (see FIG. 2) for detecting a voltage and transmitting a corresponding signal to the controller 40.

The capacitor 2 is an electric double-layer capacitor in which a plurality of capacitor cells are connected in series and set at a desired voltage and a plurality of capacitor cells are connected in parallel and set at a desired storage capacity. Here, a voltage of the capacitor 2 is set at 700 V. The capacitor 2 includes a capacitor voltage detector 2a (see FIG. 2) for detecting a voltage and transmitting a corresponding signal to the controller 40.

The DC-DC converter 10 includes a primary coil 11 connected in parallel to the secondary battery 1, a secondary coil 12 connected in series to the capacitor 2, a transformer core 13 for accumulating energy by a current flowing in the primary coil 11, an IGBT 14 as a switching element provided in series to the primary coil 11, and a smoothing condenser 15 connected in parallel to the secondary coil 12. The DC-DC converter 10 is a flyback converter for adjusting a voltage to be output from the secondary coil 12.

A current from the secondary battery 1 is directly supplied to the primary coil 11. The current intermittently flows into the primary coil 11 by the IGBT 14 being switched by the controller 40. The primary coil 11 accumulates energy in the transformer core 13 by the current supplied from the secondary battery 1.

The transformer core 13 is magnetized by the current flowing in the primary coil 11 when the IGBT 14 is switched on. In this way, magnetic energy is accumulated in the transformer core 13. The magnetic energy accumulated in the transformer core 13 is converted into an induction current flowing in the secondary coil 12 when the IGBT 14 is switched off.

The induction current flows into the secondary coil 12 from the primary coil 11 by the energy accumulated in the transformer core 13. The induction current having a lower voltage than that of the secondary battery 1 flows into the secondary coil 12. That is, the DC-DC converter 10 is a step-down converter.

The IGBT 14 is chopper-controlled by the controller 40. The IGBT 14 adjusts the voltage of the induction current flowing in the secondary coil 12 by changing a duty ratio of a chopper control. The induction current flowing in the secondary coil 12 has a higher voltage as the duty ratio of the IGBT 14 becomes higher.

The smoothing condenser 15 smoothes the voltage of the induction current intermittently flowing in the secondary coil 12 by the chopper control of the IGBT 14. In this way, the induction current flowing in the secondary coil 12 becomes a direct current having a substantially constant voltage.

The H-bridge circuit 20 selectively connects the secondary coil 12 of the DC-DC converter 10 in series to the capacitor 2 in the forward and opposite directions. The H-bridge circuit 20 includes four IGBTs 21 to 24 as switching elements arranged in an H shape between a positive terminal and a negative terminal of the secondary coil 12.

The IGBTs 21 to 24 are switched by the controller 40. The IGBT 21 and the IGBT 23 are provided while being connected in series across a first contact point 26a between a positive-side power line 25a and a negative-side power line 25b of the secondary coil 12. The IGBT 21 and the IGBT 23 are exclusively switched on. The IGBT 22 and the IGBT 24 are also provided while being connected in series across a second contact point 26b between the positive-side power line 25a and the negative-side power line 25b of the secondary coil 12. The IGBT 22 and the IGBT 24 are exclusively switched on.

The H-bridge circuit 20 connects the capacitor 2 and the secondary coil 12 in series via the first and second contact points 26a, 26b. The H-bridge circuit 20 applies a positive bias voltage to the capacitor 2 by connecting a pair of the IGBTs 21 to 24 and applies a negative bias voltage to the capacitor 2 by connecting a remaining pair of the IGBTs 21 to 24.

Specifically, if the IGBT 21 and the IGBT 24 are switched on, the secondary coil 12 is connected to the capacitor 2 in the forward direction. Thus, a positive bias voltage is applied to the voltage of the capacitor 2. On the other hand, if the IGBT 22 and the IGBT 23 are switched on, the secondary coil 12 is connected to the capacitor 2 in the opposite direction. Thus, a negative bias voltage is applied to the voltage of the capacitor 2.

By providing the H-bridge circuit 20 in this way, an apparent voltage of the capacitor 2 can be adjusted to a sum voltage of the voltage of the capacitor 2 and the bias voltage.

It should be noted that the H-bridge circuit 20 can separate the secondary coil 12 from the capacitor 2 by switching on the IGBT 21 and the IGBT 22 or switching on the IGBT 23 and the IGBT 24. In this case, only the capacitor 2 is connected between the positive-side power line 51a and the negative-side power line 51b of the inverter 50. Further, the H-bridge circuit 20 can separate the capacitor 2 from the power supply device 100 by switching off all the IGBTs 21 to 24. In this case, power is supplied to the inverter 50 only from the secondary battery 1.

The DC-DC converter 30 can supply power to the inverter 50 by stepping up the voltage of the secondary battery 1 and charge regenerative power from the inverter 50 into the secondary battery 1 by stepping down the regenerative power. The DC-DC converter 30 can step up the voltage of the secondary battery 1 from 300 V to 600 V.

The DC-DC converter 30 includes a reactor 31 provided downstream of the secondary battery 1, a step-down control transistor 32 provided between the reactor 31 and an upstream side of the electric motor 5, a step-up control transistor 33 provided between the reactor 31 and a downstream side of the electric motor 5, and a smoothing condenser 34 connected in parallel to the secondary battery 1.

The reactor 31 accumulates energy when the step-up control transistor 33 is on. When the step-up control transistor 33 is turned off, the voltage input from the secondary battery 1 and an induced electromotive force by the energy accumulated in the reactor 31 are output through a rectifying diode of the step-down transistor 32. In this way, the reactor 31 can step up and output the input voltage by the switching of the step-up control transistor 33.

The step-up control transistor 33 is switched by the controller 40. The step-up control transistor 33 is an IGBT with a rectifying diode connected in parallel in an opposite direction. The step-up control transistor 33 can step up a supply voltage to be supplied to the electric motor 5 by the induced electromotive force by switching a current of the reactor 31.

When the step-up control transistor 33 is switched on, a current from the positive electrode of the secondary battery 1 flows to the negative electrode of the secondary battery 1 by way of the reactor 31 and the step-up control transistor 33. By this current loop, energy is accumulated in the reactor 31.

The step-down control transistor 32 is switched by the controller 40. The step-down control transistor 32 is an IGBT with the rectifying diode connected in parallel in an opposite direction. The step-down control transistor 32 can step down a charge voltage from the electric motor 5 by switching. By a chopper control, the step-down control transistor 32 steps down the power generated by the electric motor 5 and charges it into the secondary battery 1.

The smoothing condenser 34 smoothes a voltage output by the chopper control of the step-down control transistor 32. In this way, a voltage when the power generated by the electric motor 5 is charged into the secondary battery 1 can be smoothed and stabilized.

The controller 40 (see FIG. 2) controls the power supply device 100. The controller 40 is a microcomputer with a CPU (Central Processing Unit), a ROM (Read-Only Memory), a RAM (Random Access Memory) and an I/O interface (Input/Output interface). The RAM stores data in the process of the CPU. The ROM stores a control program of the CPU and the like in advance. The I/O interface is used to input and output information from and to a connected device. By operating the CPU, the RAM and the like in accordance with the program stored in the ROM, the control of the power supply device 100 is realized.

Figure 3:
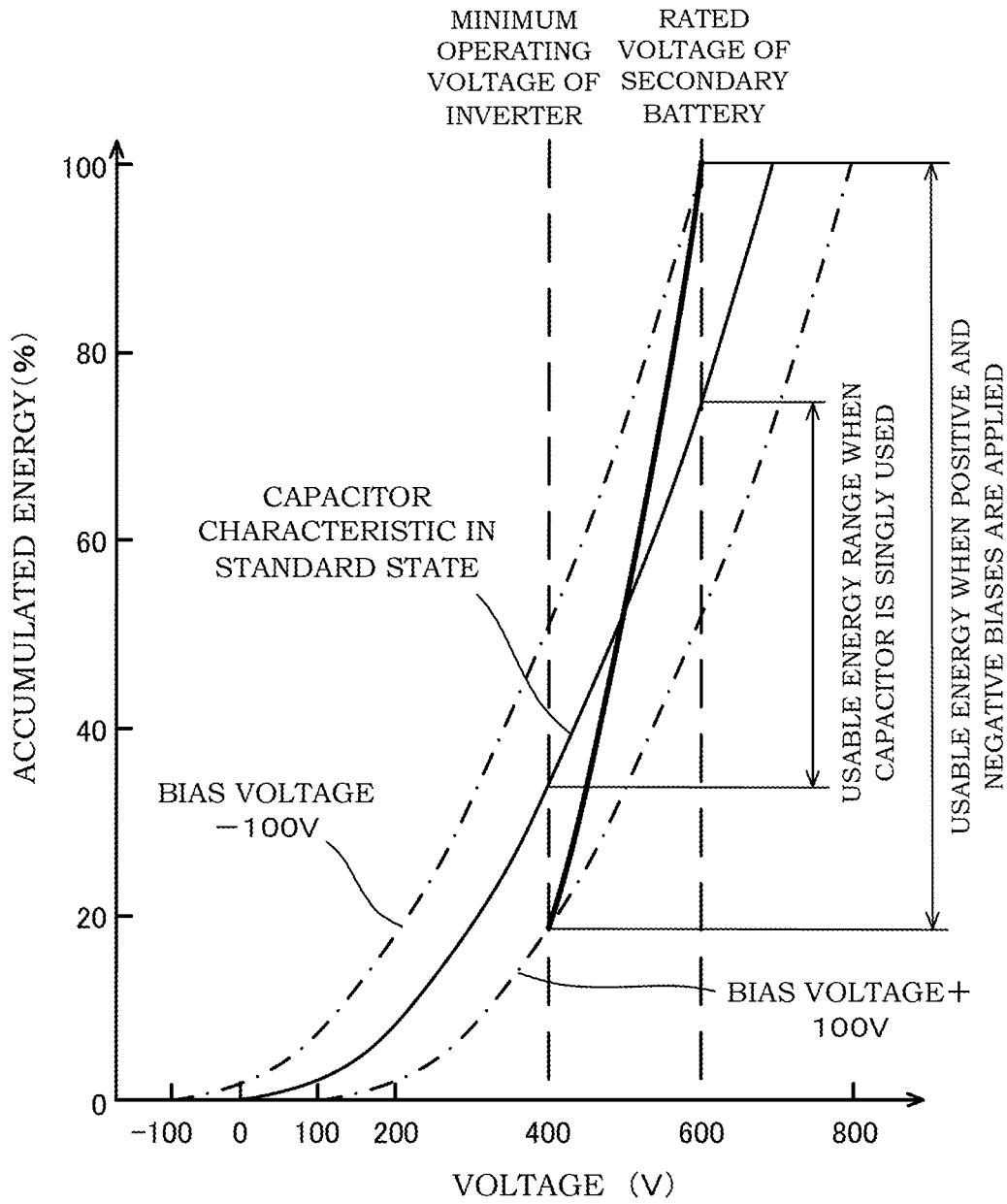
FIG. 3 is a graph showing functions of the power supply device according to the first embodiment of the present invention.

Next, functions of the power supply device 100 are described mainly with reference to FIG. 3. In FIG. 3, a horizontal axis represents the voltage (V) of the capacitor 2 and a vertical axis represents accumulated energy (%) of the capacitor 2. In FIG. 3, a solid line curve is a graph showing a relationship between the voltage and the accumulated energy in a standard state where no bias voltage is applied to the capacitor 2. Dash-dotted line curves are graphs showing a relationship between the apparent voltage of the capacitor 2 and the accumulated energy when a bias voltage of −100 V was applied and when a bias voltage of +100 V was applied. Further, a thick solid line curve is a graph showing a relationship between the apparent voltage of the capacitor 2 and the accumulated energy in the power supply device 100.

First, a case where power is supplied to the inverter 50 singly from the capacitor 2 without applying any bias voltage to the capacitor 2 is described as a comparative example.

A rated voltage of the secondary battery 1 after being stepped up by the DC-DC converter 30 is 600 V. The minimum operating voltage of the inverter 50 is 400 V. Thus, the capacitor 2 can drive the inverter 50 only in a voltage range from 400 V to 600 V. The capacitor 2 cannot drive the inverter 50 if the voltage drops below 400 V or exceeds 600 V.

Contrary to this, in the power supply device 100, a positive bias voltage and a negative bias voltage are applied to the capacitor 2. In an example shown in FIG. 3, the positive and negative bias voltages are applied to the capacitor 2 in a range from −100 V to +100 V. In this case, the following operation is performed.

If the capacitor 2 is fully charged, the controller 40 switches on the IGBT 22 and the IGBT 23 of the H-bridge circuit 20. Then, the controller 40 controls the DC-DC converter 10 to step down the voltage of the secondary battery 1 to 100 V and apply a negative bias voltage of −100 V to the capacitor 2 from the secondary coil 12. In this way, the sum of the voltage of the capacitor 2 and the bias voltage becomes 600 V and becomes equal to the voltage of the secondary battery 1 stepped up by the DC-DC converter 30. Thus, the electric motor 5 can be driven by supplying power to the inverter 50 from the secondary battery 1 and the capacitor 2 even if the voltage of the capacitor 2 exceeds 600 V.

When the electric motor 5 is driven by supplying power from the capacitor 2 to the inverter 50, the voltage of the capacitor 2 proportionally drops. At this time, the controller 40 controls the DC-DC converter 10 to gradually reduce the negative bias voltage applied to the capacitor 2. Simultaneously, the controller 40 controls the DC-DC converter 30 such that the stepped-up voltage of the secondary battery becomes equal to the sum of the voltage of the capacitor 2 and the bias voltage.

When the voltage of the capacitor 2 is further stepped down, the controller 40 switches off the IGBT 22 and the IGBT 23 of the H-bridge circuit 20 and switches on the IGBT 21 and the IGBT 24. Then, the controller 40 controls the DC-DC converter 10 to step down the voltage of the secondary battery 1 and apply a positive bias voltage to the capacitor 2 from the secondary coil 12.

When the voltage of the capacitor 2 drops to 300 V, the controller 40 controls the DC-DC converter 10 to step down the voltage of the secondary battery 1 to 100 V and apply a positive bias voltage of +100 V to the capacitor 2 from the secondary coil 12. In this way, in the power supply device 100, the electric motor 5 can be driven by supplying power to the inverter 50 from the secondary battery 1 and the capacitor 2 until the voltage of the capacitor 2 drops below 300 V.

By the above, in the power supply device 100, the sum of the voltage of the capacitor 2 and the bias voltage can be set at 400 V or higher even if the voltage of the capacitor 2 drops below 400 V. Thus, even if the voltage of the capacitor 2 drops below 400 V, the electric motor 5 can be driven by supplying power to the inverter 50 from the secondary battery 1 and the capacitor 2.

Conventionally, it has not been possible to drive the inverter 50 by utilizing electrical energy of the capacitor 2 although the electrical energy remains in the capacitor 2 if the voltage of the capacitor 2 drops below the minimum operating voltage of the inverter 50. Since the minimum voltage capable of driving the inverter 50 is 400 V, it has not been possible to drive the inverter 50 by using the electrical energy of the capacitor 2 if the voltage of the capacitor 2 drops below 400 V.

Contrary to this, in the power supply device 100, the H-bridge circuit 20 can apply a positive bias voltage to the capacitor 2 by connecting the voltage of the secondary battery 1 stepped down by the DC-DC converter 10 to the capacitor 2 in the forward direction if the voltage of the capacitor 2 drops. Thus, even if the voltage of the capacitor 2 drops, the inverter 50 can be driven by supplying the electrical energy remaining in the capacitor 2 to the inverter 50 by increasing an apparent voltage by the bias voltage. Therefore, the electrical energy of the capacitor 2 can be effectively utilized.

Further, in the power supply device 100, not only a positive bias voltage, but also a negative bias voltage can be applied to the capacitor 2. This enables a usable voltage range of the capacitor 2 to be extended not only to a low voltage side, but also to a high voltage side. Thus, the electrical energy of the capacitor 2 can be more effectively utilized.

As just described, since the electrical energy of the capacitor 2 can be effectively utilized, the capacity of the capacitor 2 necessary to output the same electrical energy to the inverter 50 can be reduced. Thus, the capacitor 2 can be reduced in size and weight.

According to the above first embodiment, the following effects are exhibited.

When the voltage of the capacitor 2 drops, the H-bridge circuit 20 can apply a positive bias voltage to the capacitor 2 by connecting the voltage of the secondary battery 1 stepped down by the DC-DC converter 10 to the capacitor 2 in the forward direction. Thus, even if the voltage of the capacitor 2 drops, the inverter 50 can be driven by supplying the electrical energy remaining in the capacitor 2 to the inverter 50 by increasing the apparent voltage by the bias voltage. Therefore, the electrical energy of the capacitor 2 can be effectively utilized.

Further, in the power supply device 100, not only a positive bias voltage, but also a negative bias voltage can be applied to the capacitor 2. This enables the usable voltage range of the capacitor 2 to be extended not only to the low voltage side, but also to the high voltage side. Thus, the electrical energy of the capacitor 2 can be effectively utilized.

It should be noted that although positive and negative bias voltages in the range from −100 V to +100 V are applied to the capacitor 2 in the present embodiment, the electrical energy of the capacitor 2 can be more effectively utilized by expanding this bias voltage range into a wider range.

Second Embodiment

Figure 4:
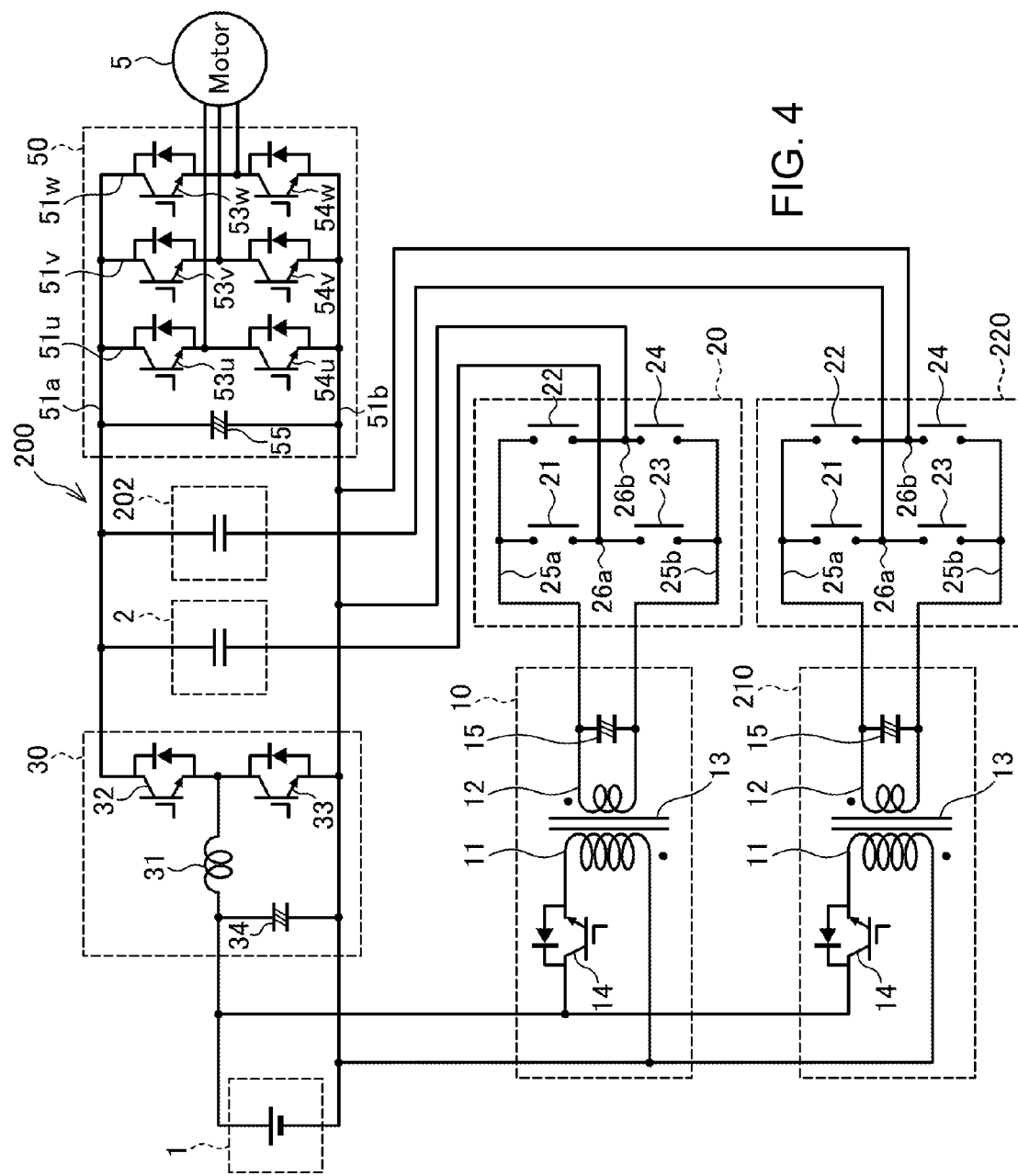
FIG. 4 is an electrical circuit diagram of a power supply device according to a second embodiment of the present invention.
Figure 5:
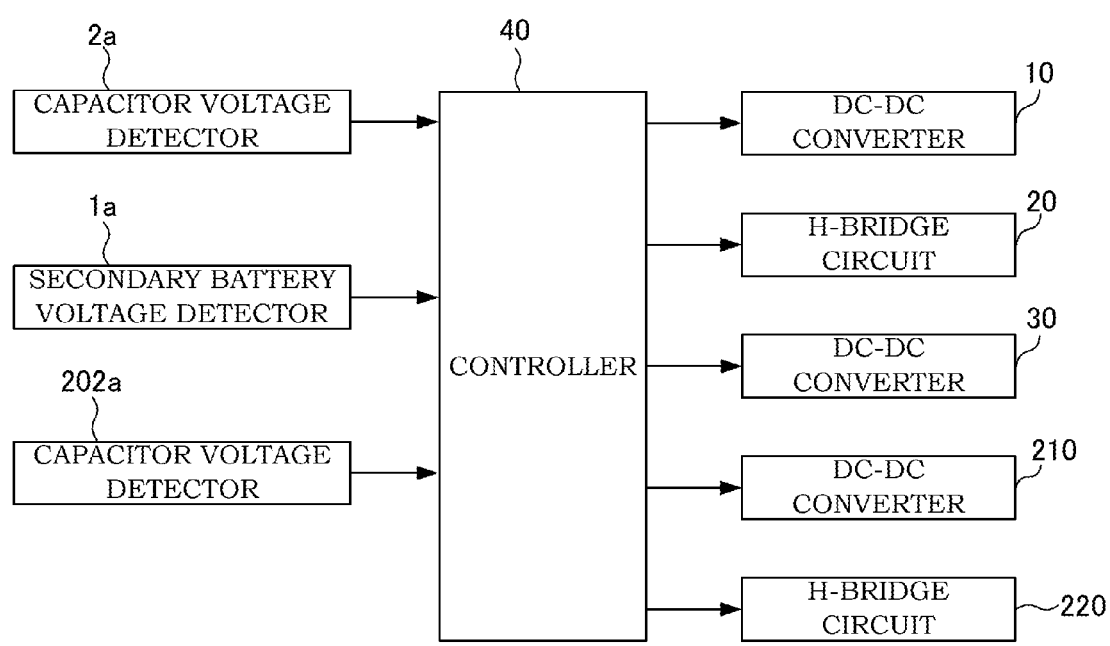
FIG. 5 is a block diagram of the power supply device according to the second embodiment of the present invention.

A power supply device 200 according to a second embodiment of the present invention is described below with reference to FIGS. 4 and 5. It should be noted that, in the second embodiment, components similar to those of the aforementioned first embodiment are denoted by the same reference signs and repeated description is omitted as appropriate.

The second embodiment differs from the first embodiment in that a plurality of capacitors 2, 202 are provided in parallel.

The power supply device 200 supplies power to an inverter 50 by combining a secondary battery 1, the capacitor 2 connected in parallel to the secondary battery 1, and the capacitor 202 likewise connected in parallel to the secondary battery 1.

The power supply device 200 is further provided with the capacitor 202, an insulation type DC-DC converter (hereinafter, merely referred to as a "DC-DC converter) 210 for applying a bias voltage to the capacitor 2 by utilizing electrical energy of the secondary battery 1, and an H-bridge circuit 220 as a switching circuit for selectively applying a bias voltage to the capacitor 2 in forward and opposite directions. That is, the power supply device 200 includes one DC-DC converter 10, 210 and one H-bridge circuit 20, 220 for each of the capacitors 2, 202.

The capacitor 202 is an electric double-layer capacitor in which a plurality of capacitor cells are connected in series and set at a desired voltage and in which a plurality of capacitor cells are connected in parallel and set at a desired storage capacity. Here, a voltage of the capacitor 202 is set at 700 V. The capacitor 202 includes a capacitor voltage detector 202a (see FIG. 5) for detecting a voltage and transmitting a corresponding signal to a controller 40.

The DC-DC converter 210 includes a primary coil 11 connected in parallel to the secondary battery 1, a secondary coil 12 connected in series to the capacitor 2, a transformer core 13 for accumulating energy by a current flowing in the primary coil 11, an IGBT 14 as a switching element provided in series to the primary coil 11, and a smoothing condenser 15 connected in parallel to the secondary coil 12. The DC-DC converter 210 is a flyback converter for adjusting a voltage to be output from the secondary coil 12.

The H-bridge circuit 220 selectively connects the secondary coil 12 of the DC-DC converter 210 in series to the capacitor 2 in the forward and opposite directions. The H-bridge circuit 220 includes four IGBTs 21 to 24 as switching elements arranged in an H shape between a positive terminal and a negative terminal of the secondary coil 12.

Since the configuration of the DC-DC converter 210 is the same as that of the DC-DC converter 10 and the configuration of the H-bridge circuit 220 is the same as that of the H-bridge circuit 20, each component is not described in detail here.

In the power supply device 200, the capacitors 2, 202 connected in parallel to each other are provided. Although a pair of capacitors are provided in the power supply device 200, three or more capacitors may be used while being connected in parallel. A potential difference may be created between the capacitors 2 and 202 due to differences in characteristics resulting from individual differences thereof while charge and discharge are repeated. Accordingly, in the power supply device 200, the controller 40 controls the DC-DC converters 10, 210 and the H-bridge circuits 20, 220 to adjust the magnitudes of positive or negative bias voltages so that the sums of the voltages of the capacitors 2, 202 and bias voltages applied to the capacitors 2, 202 become equal.

In this way, because apparent voltages of the capacitors 2, 202 can be adjusted to be substantially equal, a voltage balance can be established between the capacitors 2 and 202. Thus, a voltage unbalance caused by differences in characteristics resulting from individual differences of the capacitors 2, 202 can be suppressed. Therefore, performances of the capacitors 2, 202 can be fully exhibited. And the deterioration and life reduction of the capacitors 2, 202 can be suppressed.

Further, since the number of the capacitors connected in parallel can be changed in the power supply device 200, storage capacities of the capacitors can be changed according to the weight of a vehicle to which the power supply device 200 is applied. Thus, for example, if the power supply device 200 is applied to a vehicle having a larger weight, a high current can be input and output in a short time by increasing the number of capacitors connected in parallel.

According to the above second embodiment, as in the first embodiment, the H-bridge circuit 20, 220 can apply a positive bias voltage to the capacitor 2, 202 by connecting the voltage of the secondary battery 1 stepped down by the DC-DC converter 10, 210 to the capacitor 2, 202 in the forward direction when the voltage of the capacitor 2, 202 drops. Thus, even if the voltage of the capacitor 2, 202 drops, the inverter 50 can be driven by supplying the electrical energy remaining in the capacitor 2, 202 by increasing the apparent voltage by the bias voltage. Therefore, the electrical energy of the capacitor 2, 202 can be effectively utilized.

Further, in the power supply device 200, not only positive bias voltages, but also negative bias voltages can be applied to the capacitors 2, 202. This enables a usable voltage range of the capacitors 2, 202 to be extended not only to a low voltage side, but also to a high voltage side. Thus, the electrical energy of the capacitors 2, 202 can be effectively utilized.

Further, the apparent voltages of the capacitors 2, 202 can be adjusted to be substantially equal by controlling the DC-DC converters 10, 210 and the H-bridge circuits 20, 220 to adjust the magnitudes of the positive or negative bias voltages so that the sums of the voltages of the capacitors 2, 202 and the bias voltages applied to the capacitors 2, 202 become equal. Thus, the performances of the capacitors 2, 202 can be fully exhibited. And the deterioration and life reduction of the capacitors 2, 202 can be suppressed.

Further, since the number of the capacitors connected in parallel can be changed in the power supply device 200, the storage capacities of the capacitors can be changed according to the weight of a vehicle to which the power supply device 200 is applied. Thus, for example, if the power supply device 200 is applied to a vehicle having a larger weight, a high current can be input and output in a short time by increasing the number of capacitors connected in parallel.

Embodiments of this invention were described above, but the above embodiments are merely examples of applications of this invention, and the technical scope of this invention is not limited to the specific constitutions of the above embodiments.

For example, numerical values such as those of the voltages in the aforementioned embodiments are illustrative and there is no limitation to these numerical values. Further, although the three-phase induction motor generator is used as the electric motor 5 in the aforementioned embodiments, another electric motor to be controlled by a direct current source and an inverter such as a synchronous electric motor, a two-phase induction electric motor or a single-phase induction electric motor may be used instead of this.

Further, in the aforementioned embodiments, the power supply device 100, 200 is controlled by the controller 40 and the inverter 50 is controlled by the motor controller (not shown). Instead of this, the power supply device 100, 200 and the inverter 50 may be controlled by a single controller.

Further, each of the aforementioned IGBTs is an IGBT with a rectifying diode connected in parallel in an opposite direction. Instead of this, an IGBT incorporating no diode and a rectifying diode connected in parallel to the IGBT in an opposite direction may be separately provided. Further, instead of IGBTs, other transistors such as MOSFETs (Metal-Oxide-Semiconductor Field-Effect Transistors) may be used as switching elements.

The embodiments of this invention in which an exclusive property or privilege is claimed are defined as follows:

1. A power supply device for supplying power to a load by combining a secondary battery and a capacitor connected in parallel to the secondary battery, the power supply device comprising:
    an insulation type DC-DC converter including a primary coil and a secondary coil, the primary coil being connected in parallel to the secondary battery, the primary coil being configured to accumulate energy by a current supplied from the secondary battery, the secondary coil being configured such that an induction current flows thereinto from the primary coil by the accumulated energy; and
    a switching circuit configured to selectively connect either end of the secondary coil in series to the capacitor.

2. The power supply device according to claim 1, wherein:
    the switching circuit is an H-bridge circuit including four switching elements.

3. The power supply device according to claim 2, wherein:
    the switching circuit applies a positive bias voltage to the capacitor by connecting a pair of the switching elements and applies a negative bias voltage to the capacitor by connecting a remaining pair of the switching elements.

4. The power supply device according to claim 1, wherein:
    a plurality of the capacitors are provided; and
    the insulation type DC-DC converter and the switching circuit are provided for each of the capacitors.

5. The power supply device according to claim 4, wherein:
    the insulation type DC-DC converters and the switching circuits adjust the magnitudes of positive or negative bias voltages, the insulation type DC-DC converters and the switching circuits applying the adjusted bias voltages to the capacitors so that the sums of the voltages of the capacitors and the bias voltages become equal.

6. The power supply device according to claim 1, further comprising a non-insulation type DC-DC converter capable of supplying a current to the load by stepping up a voltage of the secondary battery and charging a regenerated current from the load into the secondary battery by stepping down the regenerated current.

7. The power supply device according to claim 6, wherein:
    a current from the secondary battery is directly supplied to the primary coil.

8. The power supply device according to claim 1, wherein:
    the load is an inverter for driving an electric motor by the supply of power from the secondary battery and the capacitor.

* * * * *